(12) United States Patent
Gill

(10) Patent No.: US 6,628,478 B2
(45) Date of Patent: Sep. 30, 2003

(54) WRITE HEAD WITH ALL METALLIC LAMINATED POLE PIECES WITH THICKNESS DIFFERENTIAL

(75) Inventor: Hardayal Singh Gill, Palo Alto, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 225 days.

(21) Appl. No.: 09/837,710

(22) Filed: Apr. 17, 2001

(65) Prior Publication Data

US 2002/0149886 A1 Oct. 17, 2002

(51) Int. Cl.$^7$ .............................................. G11B 5/147
(52) U.S. Cl. ........................................ 360/126; 360/317
(58) Field of Search ................................ 360/126, 317, 360/324.11, 324.12, 327.32

(56) References Cited

U.S. PATENT DOCUMENTS

| | | | |
|---|---|---|---|
| 4,814,921 A | | 3/1989 | Hamakawa et al. ........ 360/126 |
| 4,935,311 A | | 6/1990 | Nakatani et al. ............ 428/611 |
| 5,108,837 A | | 4/1992 | Mallary ...................... 428/336 |
| 5,132,859 A | * | 7/1992 | Andricacos et al. ........ 360/126 |
| 5,313,356 A | | 5/1994 | Ohkubo et al. ............. 360/126 |
| 5,379,172 A | * | 1/1995 | Liao ........................... 360/126 |
| 5,663,857 A | | 9/1997 | Kumura et al. ............. 360/126 |
| 5,750,251 A | * | 5/1998 | Ohji ........................... 428/332 |
| 5,751,528 A | * | 5/1998 | Nepela et al. .............. 360/126 |
| 5,792,547 A | * | 8/1998 | Liu et al. .................... 428/212 |
| 5,940,253 A | * | 8/1999 | Mallary et al. ............. 360/126 |
| 6,197,439 B1 | * | 3/2001 | Parkin et al. ............... 428/678 |
| 6,233,116 B1 | * | 5/2001 | Chen et al. ................. 360/126 |
| 6,259,583 B1 | * | 7/2001 | Fontana et al. ............. 360/126 |
| 6,301,075 B1 | * | 10/2001 | Sato ........................... 360/126 |

FOREIGN PATENT DOCUMENTS

| | | |
|---|---|---|
| JP | 58-045617 | 3/1983 |
| JP | 58-171709 | 10/1983 |
| JP | 58-192311 | 11/1983 |
| JP | 01-283907 | 11/1989 |
| JP | 05-029172 | 2/1993 |

* cited by examiner

Primary Examiner—Brian E. Miller
(74) Attorney, Agent, or Firm—Ervin F. Johnston

(57) ABSTRACT

A magnetic write head has first and second pole piece layers wherein each pole piece layer is a lamination of alternate ferromagnetic and nonmagnetic metal films. Each nonmagnetic metal film causes an antiferromagnetic coupling between ferromagnetic films adjacent thereto so that the adjacent ferromagnetic films are antiparallel exchange coupled for at least partial flux closure therebetween. This reduces the domain walls within the pole piece layers so that the pole piece layers have a higher frequency response to energization by a write coil.

23 Claims, 5 Drawing Sheets

WRITE HEAD WITH ALL METALLIC LAMINATED POLE PIECES WITH THICKNESS DIFFERENTIAL

BACKGROUND OF THE INVENTION

1. Field of the Invention

The present invention relates to a write head with all metallic laminated pole pieces and, more particularly, to such a write head wherein alternate ferromagnetic films in each pole piece have at least partial flux closure for minimizing domain walls in the pole pieces and increasing a frequency response of the write head.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

A write head typically employs ferromagnetic first and second pole pieces which are capable of carrying flux signals for the purpose of writing magnetic impressions into a track on a magnetic medium, such as a rotating magnetic disk. Each of the first and second pole pieces has a yoke region which is located between a pole tip region and a back gap region. The pole tip region is located at the ABS and the back gap region is spaced from the pole tip region at a recessed location within the write head. At least one coil layer is embedded in an insulation stack which is located between the first and second pole pieces in the yoke region. A nonmagnetic write gap layer is located between the pole tip regions of the first and second pole pieces. The thinner the thickness of the write gap layer, the greater the number of bits the write head can write into the track of a rotating magnetic disk. The first and second pole pieces are magnetically connected at the back gap. Processing circuitry digitally energizes the write coil which induces flux into the first and second pole pieces so that flux signals bridge across the write gap at the ABS to write the aforementioned magnetic impressions or bits into the track of the rotating disk. The second pole piece has a second pole piece yoke (P2 yoke) which is magnetically connected to the second pole tip (P2 tip) and extends to the back gap for connection to the first pole piece.

A write head is typically rated by its areal density which is a product of its linear bit density and its track width density. The linear bit density is the number of bits which can be written per linear inch along the track of a rotating magnetic disk and the track width density is the number of tracks that can be written per inch along a radius of the rotating magnetic disk. The linear bit density is quantified as bits per inch (BPI) and the track width density is quantified as tracks per inch (TPI). As discussed hereinabove, the linear bit density depends upon the thickness of the write gap layer. The track width density is directly dependent upon the width of the second pole tip at the ABS. Efforts over the years to increase the areal density of write heads have resulted in computer storage capacities increasing from kilobytes to megabytes to gigabytes.

The first and second pole pieces are typically fabricated by frame plating. Photoresist is employed to provide the frame and a seed layer is employed to provide a return path for the plating operation. A typical sequence for fabricating a pole piece is to sputter clean the wafer, sputter deposit a seed layer, such as nickel iron, on the wafer, spin a layer of photoresist on the wafer, light-image the photoresist layer through a mask to expose areas of the photoresist that are to be removed (assuming that the photoresist is a positive photoresist), develop the photoresist to remove the light-exposed areas to provide an opening in the photoresist and then plate the pole piece in the opening up to a desired height.

The magnetic moment of each pole piece is parallel to the ABS and to the major planes of the layers of the write head. When a write current is applied to the coil of the write head the magnetic moment rotates toward or away from the ABS, depending upon whether the write signal is positive or negative. When the magnetic moment is rotated from the parallel position, magnetic flux fringes across the write gap layer between the first and second pole pieces impressing a positive or negative bit in the track of a rotating magnetic disk. Assuming a disk rotation sufficient to provide the aforementioned air bearing and a particular write signal frequency, the aforementioned linear bit density can be calculated. As the write current frequency is increased, the linear bit density is also increased. An increase in the linear bit density is desirable in order to increase the aforementioned areal density which provides a computer with increased storage capacity. Unfortunately, the write current density is limited by the domain walls in the first and second pole pieces. Because of the energy required to move the domain walls around, the domain walls reduce the write time of the flux within the pole pieces in response to the write current frequency. Accordingly, the domain walls lessen the amount of flux that bridges between the write gap and reduces the strength of the magnetic impression into the track of the rotating magnetic disk. This can be corrected in two ways. First, the write current frequency can be decreased and/or the write current can be increased. Unfortunately, a decrease in the write current frequency results in a decrease in the linear bit density of the write head, and an increase in the amount of write current increases the generation of heat within the write head. An increase in the heat of the write head can destroy the delicate read sensor and/or cause one or more layers to protrude at the ABS due to expansion of the insulation stack.

SUMMARY OF THE INVENTION

The present invention overcomes the aforementioned problem by making the first and second pole pieces a lamination of alternate ferromagnetic and nonmagnetic metal films. Each nonmagnetic metal film causes an antiferromagnetic coupling between ferromagnetic films adjacent thereto so that the adjacent ferromagnetic films are antiparallel exchange coupled for at least partial flux closure therebetween. In a preferred embodiment, each nonmagnetic film is composed of ruthenium (Ru) and each ferromagnetic film is composed of nickel iron (NiFe). It is important that each nonmagnetic film be sufficiently thin so as to cause the antiferromagnetic coupling between the adjacent ferromagnetic films. This thickness is preferably in a range from 5 Å to 20 Å. Further, it is important that the adjacent ferromagnetic films have a thickness differential so that there is a uniaxial anisotropy $H_K$ to position the magnetic moment of the pole piece parallel to the ABS and the major planes of layers of the write head. The present invention enables the $H_K$ to be set at a desired amount so that each pole piece is highly responsive to the write current signal. Further, the invention enables the ferromagnetic and nonmagnetic metal films of each pole piece to be formed by plating or sputtering.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
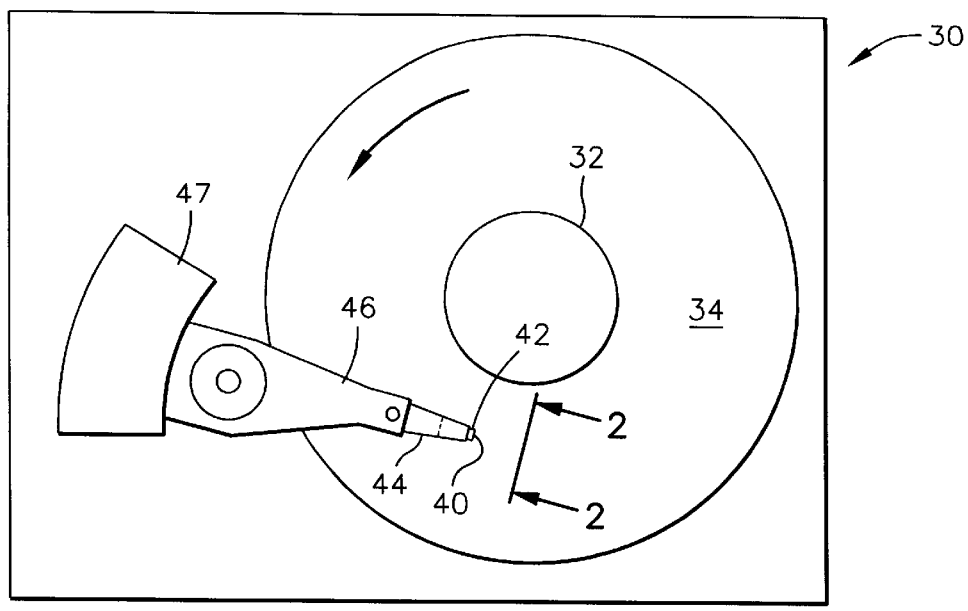
FIG. 1 is a plan view of an exemplary prior art magnetic disk drive.
Figure 2:
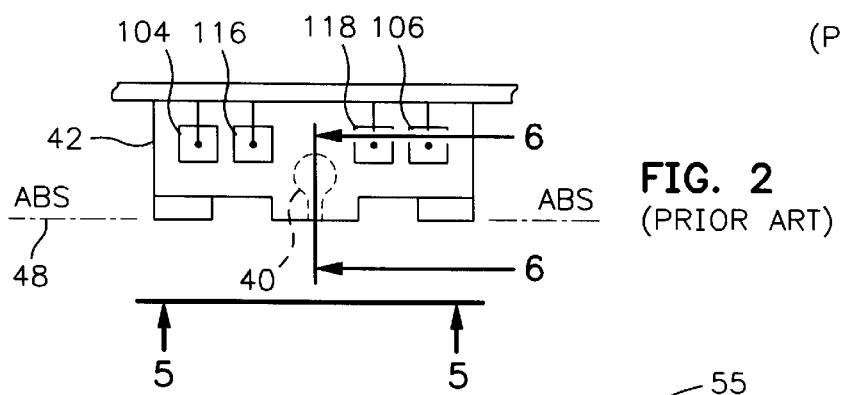
FIG. 2 is an end view of a prior art slider with a magnetic head of the disk drive as seen in plane 2—2 of FIG. 1.
Figure 3:
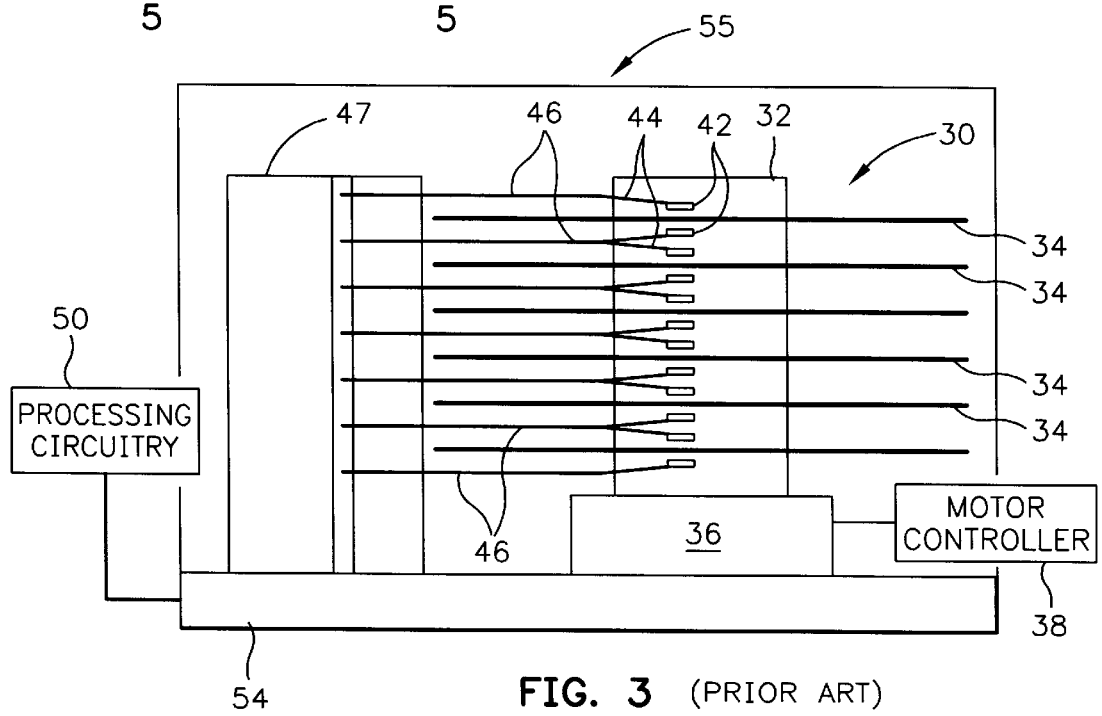
FIG. 3 is an elevation view of the prior art magnetic disk drive wherein multiple disks and magnetic heads are employed.
Figure 4:
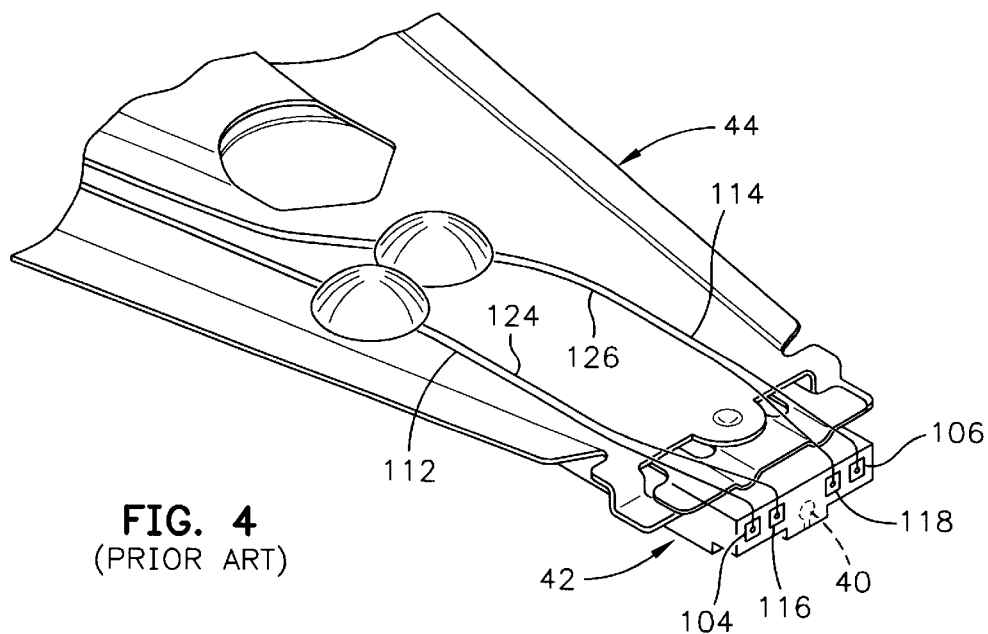
FIG. 4 is an isometric illustration of an exemplary prior art suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
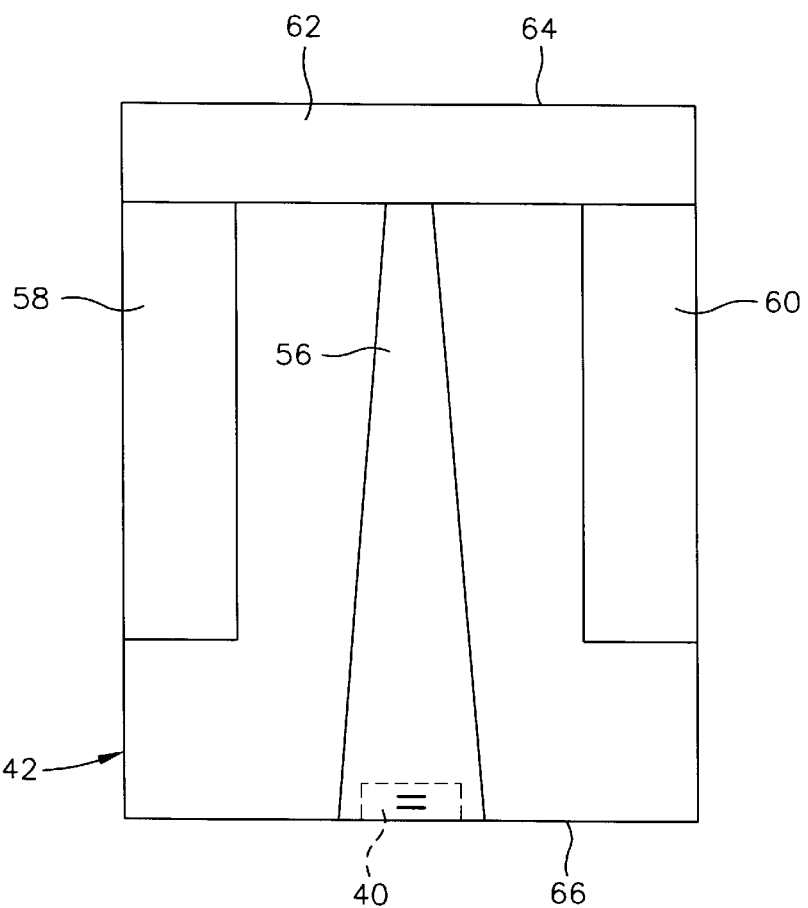
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
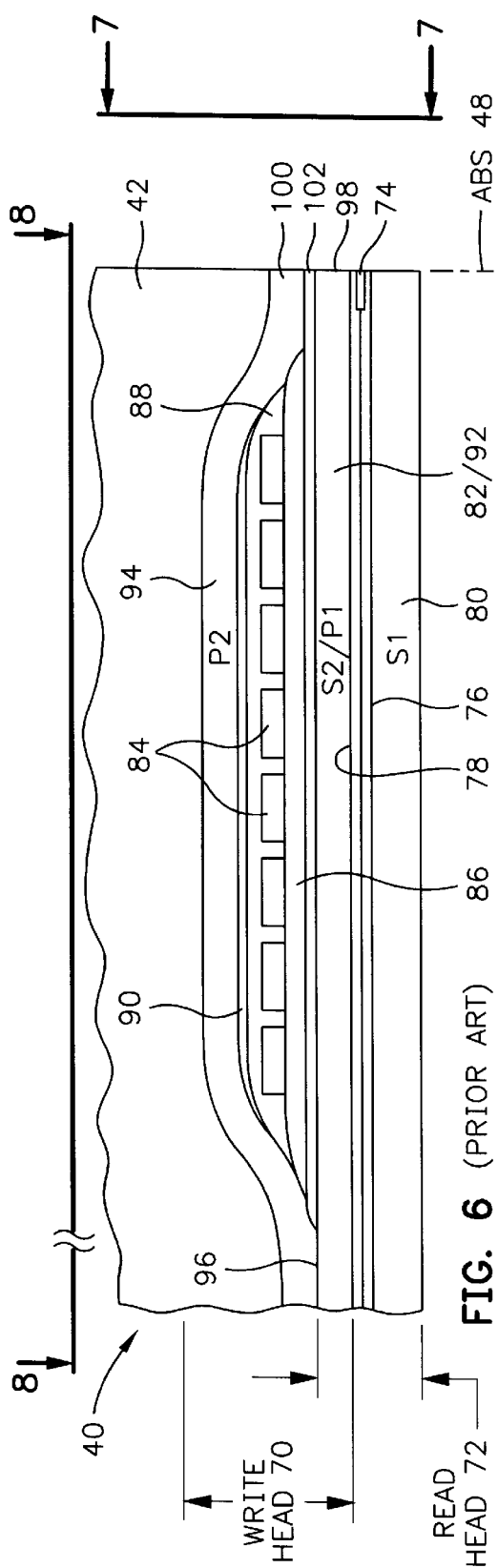
FIG. 6 is a partial view of the slider and a prior art merged magnetic head as seen in plane 6—6 of FIG. 2.
Figure 7:
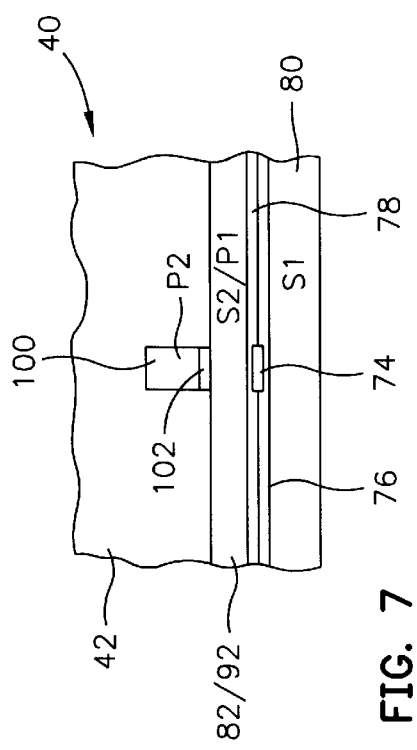
FIG. 7 is a partial ABS view of the slider taken along plane 7—7 of FIG. 6 to show the read and write elements of the magnetic head.

FIG. 6 is a side cross-sectional elevation view of a merged magnetic head 40, which includes a write head portion 70 and a read head portion 72, the read head portion employing a dual spin valve sensor 74 of the present invention. FIG. 7 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 8:
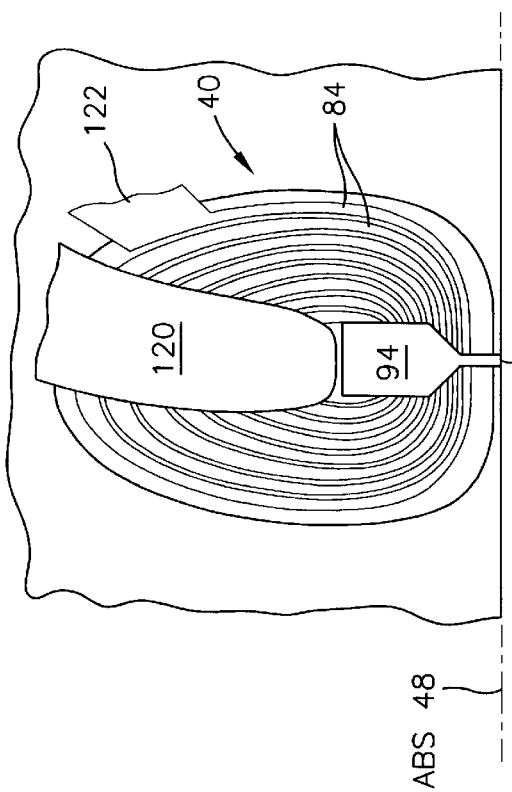
FIG. 8 is a view taken along plane 8—8 of FIG. 6 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head the second shield layer and the first pole piece layer are separate layers which are separated by a nonmagnetic layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

The Invention

Figure 9:
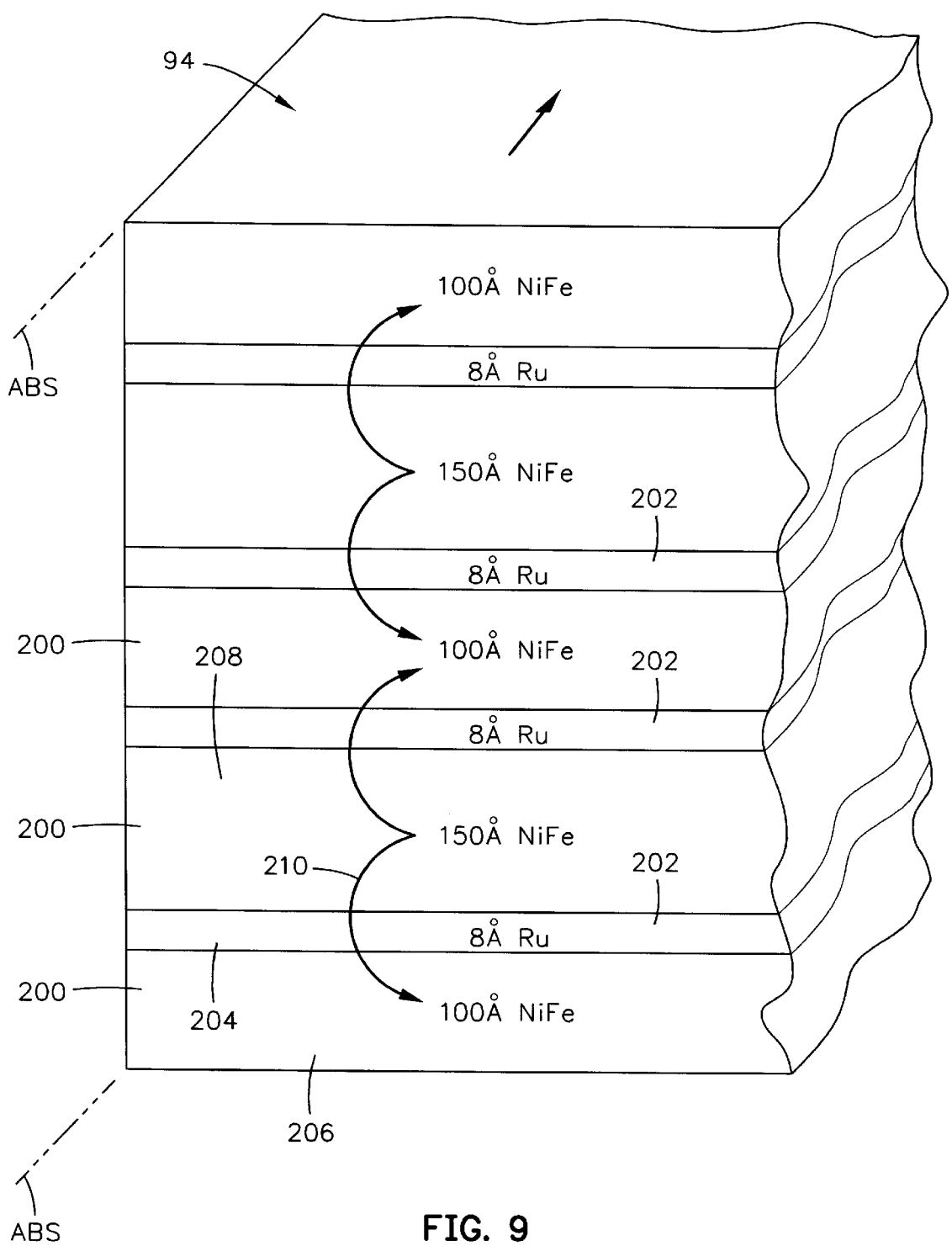
FIG. 9 is an isometric illustration of a front portion of the second pole piece layer 94 in FIG. 6.
Figure 10:
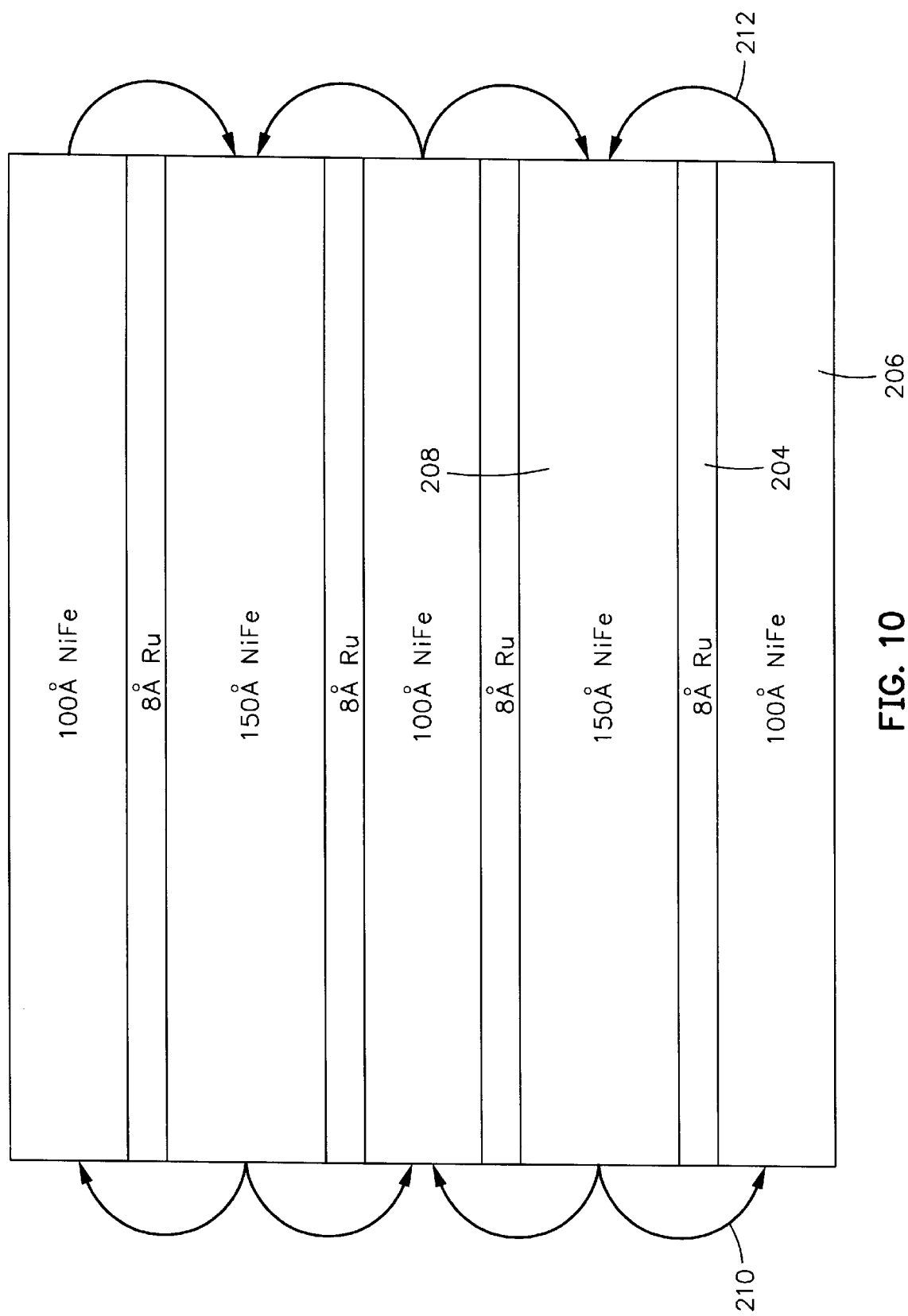
FIG. 10 is a transverse cross-section taken through FIG. 9.

FIG. 9 illustrates an enlarged front portion of the second pole piece layer 94 which is a lamination of alternate ferromagnetic and nonmagnetic metal films 200 and 202, respectively. Each nonmagnetic metal film, such as film 204, causes an antiferromagnetic coupling between ferromagnetic films 206 and 208 adjacent thereto. This causes the adjacent ferromagnetic films 206 and 208 to be antiparallel exchange coupled so that there is at least partial flux closure therebetween. As shown in FIGS. 9 and 10, the ferromagnetic film 208 has magnetic flux 210 exiting one end and entering one end of the ferromagnetic film 206, and the ferromagnetic film 206 has magnetic flux 212 exiting a second end and entering a second end of the ferromagnetic film 208. This is the partial flux closure referred to hereinabove. The ferromagnetic film 208 has partial flux closure with the ferromagnetic film immediately thereabove and so on to the top of the pole piece layer. This partial flux closure reduces the demagnetizing (demag) fields of the ferromagnetic films so that domain walls within the ferromagnetic films are minimized. Antiparallel (AP) coupling is fully described in U.S. Pat. No. 5,465,185 which is incorporated by reference herein.

The nonmagnetic films 202 must be sufficiently thin so as to implement the antiferromagnetic coupling field between the ferromagnetic films. A preferred material for each of the nonmagnetic films 202 is ruthenium (Ru), and a preferred thickness range of the ruthenium is 5 Å to 20 Å. A preferred material for each of the ferromagnetic films 200 is nickel iron ($Ni_{83}Fe_{17}$). It is required that there be a differential thickness between adjacent ferromagnetic films, such as adjacent ferromagnetic films 206 and 208, in order to establish a desired uniaxial anisotropy $H_K$. If the $H_K$ is too high the magnetic moment of the pole piece layer is too stiff to respond readily to write coil signals and if it is too low it will not be stable in its position parallel to the ABS. The uniaxial anisotropy $H_K$ of adjacent layers, such as adjacent layers 206 and 208, is determined by the following formula:

$$H_K = H_{K1} t_1 \times H_{K2} \times t_2 \div t_2 - t_1$$

wherein $H_{K1}$ and $H_{K2}$ are the uniaxial anisotropies of the ferromagnetic films 206 and 208, and $t_1$, and $t_2$ are the thicknesses of the ferromagnetic films 206 and 208. A preferred differential thickness is from 50 Å to 100 Å. The differential thickness shown in FIGS. 9 and 10 is 50 Å. In any embodiment the differential thickness should be at least 10 Å. It should be noted that the differential thickness sets the uniaxial anisotropy $H_K$. Since there is a differential thickness, there is some demagnetizing field remaining in the ferromagnetic films. However, the antiparallel coupling field between the layers is stronger than the remaining demagnetizing field which stabilizes the magnetic moment of the pole piece layer. With the antiparallel exchange coupling between the ferromagnetic films a single domain structure can be obtained for each pole piece layer. In a preferred embodiment, both of the pole piece layers 92 and 94 are laminated according to the present invention.

It should be understood that FIGS. 9 and 10 only illustrate a small number of the laminated films that would be employed in an actual pole piece layer. Since a pole piece layer is typically about 1 μm thick, about 40 adjacent ferromagnetic films would be employed, assuming the thickness of the adjacent ferromagnetic films and the nonmagnetic film therebetween is about 250 Å. While not preferred, it should be understood that other materials may be substituted for the nonmagnetic films such as copper (Cu), rhodium (Rh) and osmium (Os). Alternatively, a combination of ruthenium and osmium may be employed, such as ruthenium osmium ($Ru_{80}Os_{20}$) or ($Ru_{50}Os_{50}$).

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic write head having an air bearing surface (ABS), comprising:
    ferromagnetic first and second pole piece layers that have a yoke portion located between a pole tip portion and a back gap portion;
    a nonmagnetic write gap layer located between the pole tip portions of the first and second pole piece layers;
    an insulation stack with at least one coil layer embedded therein located between the yoke portions of the first and second pole piece layers;
    the first and second pole piece layers being connected at their back gap portions;
    at least one of the first and second pole piece layers being a lamination of alternate ferromagnetic and nonmagnetic metal films;
    each nonmagnetic metal film causing an antiferromagnetic coupling between ferromagnetic films adjacent thereto so that the adjacent ferromagnetic films are antiparallel exchange coupled for at least partial flux closure therebetween; and
    said adjacent ferromagnetic films having a thickness differential of at least 10 Å.

2. A magnetic write head as claimed in claim 1 wherein each nonmagnetic film is composed of ruthenium (Ru).

3. A magnetic write head as claimed in claim 1 wherein each ferromagnetic film is composed of nickel iron (NiFe).

4. A magnetic write head as claimed in claim 1 wherein each nonmagnetic film has a thickness from 5 Å to 20 Å.

5. A magnetic write head as claimed in claim 4 wherein each nonmagnetic film is composed of ruthenium (Ru) and each ferromagnetic film is composed of nickel iron (NiFe).

6. A magnetic head assembly having an air bearing surface (ABS), comprising:
    a write head including:
        ferromagnetic first and second pole piece layers that have a yoke portion located between a pole tip portion and a back gap portion;
        a nonmagnetic write gap layer located between the pole tip portions of the first and second pole piece layers;
        an insulation stack with at least one coil layer embedded therein located between the yoke portions of the first and second pole piece layers;
        the first and second pole piece layers being connected at their back gap portions;
        at least one of the first and second pole piece layers being a lamination of alternate ferromagnetic and nonmagnetic metal films;
        each nonmagnetic metal film causing an antiferromagnetic coupling between ferromagnetic films adjacent thereto so that the adjacent ferromagnetic films are antiparallel exchange coupled for at least partial flux closure therebetween;
        said adjacent ferromagnetic films having a thickness differential of at least 10 Å;
    a read head including:
        a read sensor;
        nonmagnetic electrically nonconductive first and second read gap layers;
        the read sensor being located between the first and second read gap layers;
        a ferromagnetic first shield layer; and
        the first and second read gap layers being located between the first shield layer and the first pole piece layer.

7. A magnetic head assembly as claimed in claim 6 wherein each nonmagnetic film is composed of ruthenium (Ru) and each ferromagnetic film is composed of nickel iron (NiFe).

8. A magnetic head assembly as claimed in claim 6 wherein each nonmagnetic film has a thickness from 5 Å to 20 Å.

9. A magnetic head assembly as claimed in claim 8 wherein each nonmagnetic film is composed of ruthenium (Ru) and each ferromagnetic film is composed of nickel iron (NiFe).

10. A magnetic disk drive including at least one magnetic head assembly that has an air bearing surface (ABS) and that includes a write head and a read head, comprising:
- a write head including:
  - ferromagnetic first and second pole piece layers that have a yoke portion located between a pole tip portion and a back gap portion;
  - a nonmagnetic write gap layer located between the pole tip portions of the first and second pole piece layers;
  - an insulation stack with at least one coil layer embedded therein located between the yoke portions of the first and second pole piece layers;
  - the first and second pole piece layers being connected at their back gap portions;
  - at least one of the first and second pole piece layers being a lamination of alternate ferromagnetic and nonmagnetic metal films;
  - each nonmagnetic metal film causing an antiferromagnetic coupling between ferromagnetic films adjacent thereto so that the adjacent ferromagnetic films are antiparallel exchange coupled for at least partial flux closure therebetween; and
  - said adjacent ferromagnetic films having a thickness differential of at least 10 Å;
- a read head including:
  - a read sensor;
  - nonmagnetic electrically nonconductive first and second read gap layers;
  - the read sensor being located between the first and second read gap layers;
  - a ferromagnetic first shield layer; and
  - the first and second read gap layers being located between the first shield layer and the first pole piece layer;
- a housing;
- a magnetic disk rotatably supported in the housing;
- a support mounted in the housing for supporting the magnetic head assembly with said ABS facing the magnetic disk so that the magnetic head assembly is in a transducing relationship with the magnetic disk;
- a spindle motor for rotating the magnetic disk;
- an actuator positioning means connected to the support for moving the magnetic head assembly to multiple positions with respect to said magnetic disk; and
- a processor connected to the magnetic head assembly, to the spindle motor and to the actuator for exchanging signals with the magnetic head assembly, for controlling movement of the magnetic disk and for controlling the position of the magnetic head assembly.

11. A magnetic disk drive as claimed in claim 10 wherein each nonmagnetic film is composed of ruthenium (Ru) and each ferromagnetic film is composed of nickel iron (NiFe).

12. A magnetic disk drive as claimed in claim 10 wherein each nonmagnetic film has a thickness from 5 Å to 20 Å.

13. A magnetic disk drive as claimed in claim wherein each nonmagnetic film is composed of ruthenium (Ru) and each ferromagnetic film is composed of nickel iron (NiFe).

14. A method of magnetic write head comprising the steps of:
- forming ferromagnetic first and second pole piece layers in pole tip, yoke and back gap regions wherein the yoke region is located between the pole tip and back gap regions;
- forming a nonmagnetic electrically nonconductive write gap layer between the first and second pole piece layers in the pole tip region;
- forming an insulation stack with at least one coil layer embedded therein between the first and second pole piece layers in the yoke region;
- connecting the first and pole piece layers at said back gap region;
- forming at least one of the first and second pole piece layers as a lamination of alternate ferromagnetic and nonmagnetic metal films;
- forming each nonmagnetic metal film so as to cause an antiferromagnetic coupling between ferromagnetic films adjacent thereto so that the adjacent ferromagnetic films are antiparallel exchange coupled for at least partial flux closure therebetween; and
- forming said adjacent ferromagnetic films with a thickness differential of at least 10 Å.

15. A method as claimed in claim 14 wherein each nonmagnetic film is formed of ruthenium (Ru).

16. A method as claimed in claim 14 wherein each ferromagnetic film is formed of nickel iron (NiFe).

17. A method as claimed in claim 14 wherein each nonmagnetic film is formed with a thickness from 5 Å to 20 Å.

18. A method as claimed in claim 17 wherein each nonmagnetic film is formed of ruthenium (Ru) and each ferromagnetic film is formed of nickel iron (NiFe).

19. A method of making magnetic head assembly that has an air bearing surface (ABS), comprising the steps of:
- making a write head including the steps of:
  - forming ferromagnetic first and second pole piece layers in pole tip, yoke and back gap regions wherein the yoke region is located between the pole tip and back gap regions;
  - forming a nonmagnetic electrically nonconductive write gap layer between the first and second pole piece layers in the pole tip region;
  - forming an insulation stack with at least one coil layer embedded therein between the first and second pole piece layers in the yoke region;
  - connecting the first and pole piece layers at said back gap region;
  - forming at least one of the first and second pole piece layers as a lamination of alternate ferromagnetic and nonmagnetic metal films;
  - forming each nonmagnetic metal film so as to cause an antiferromagnetic coupling between ferromagnetic films adjacent thereto so that the adjacent ferromagnetic films are antiparallel exchange coupled for at least partial flux closure therebetween; and
  - forming said adjacent ferromagnetic films with a thickness differential of at least 10 Å;
- making a read head including the steps of:
  - forming nonmagnetic electrically nonconductive first and second read gap layers;
  - forming a read sensor between the first and second read gap layers; and
  - forming the first and second read gap layers between the first shield layer and the first pole piece layer.

20. A method as claimed in claim 19 wherein each nonmagnetic film is formed of ruthenium (Ru).

21. A method as claimed in claim 19 wherein each ferromagnetic film is formed of nickel iron (NiFe).

22. A method as claimed in claim 19 wherein each nonmagnetic film is formed with a thickness from 5 Å to 20 Å.

23. A method as claimed in claim 22 wherein each nonmagnetic film is formed of ruthenium (Ru) and each ferromagnetic film is formed of nickel iron (NiFe).

* * * * *

UNITED STATES PATENT AND TRADEMARK OFFICE
CERTIFICATE OF CORRECTION

PATENT NO. : 6,628,478 B2
DATED : September 30, 2003
INVENTOR(S) : Gill

It is certified that error appears in the above-identified patent and that said Letters Patent is hereby corrected as shown below:

Column 5,
Line 24, change the formula from "$H_K = H_{K1}t_1 \times H_{K2} \times t_2 + t_2 - t_1$" to
-- $H_K = H_{K1}t_1 \times H_{K2} \times t_2 \div t_2 - t_1$ --

Signed and Sealed this

Second Day of March, 2004

JON W. DUDAS
*Acting Director of the United States Patent and Trademark Office*